US008820169B2

(12) United States Patent
August et al.

(10) Patent No.: US 8,820,169 B2
(45) Date of Patent: *Sep. 2, 2014

(54) COMPENSATION OF STRESS EFFECTS ON PRESSURE SENSOR COMPONENTS

(71) Applicant: Silicon Microstructures, Inc., Milpitas, CA (US)

(72) Inventors: Richard J. August, Concord, CA (US); Michael B. Doelle, Mountain View, CA (US)

(73) Assignee: Silicon Microstructures, Inc., Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/851,040

(22) Filed: Mar. 26, 2013

(65) Prior Publication Data

US 2013/0341740 A1 Dec. 26, 2013

Related U.S. Application Data

(63) Continuation of application No. 13/029,114, filed on Feb. 16, 2011, now Pat. No. 8,402,835.

(51) Int. Cl.
*G01L 19/04* (2006.01)
*G01L 9/02* (2006.01)

(52) U.S. Cl.
USPC ............ 73/708; 73/719; 73/725; 73/734; 29/592

(58) Field of Classification Search
None
See application file for complete search history.

(56) References Cited

U.S. PATENT DOCUMENTS

| 5,773,896 | A | * | 6/1998 | Fujimoto et al. | ............ 257/777 |
| 6,813,954 | B2 | | 11/2004 | Gokhfeld | |
| 7,437,260 | B2 | | 10/2008 | Ausserlechner et al. | |
| 8,132,465 | B1 | | 3/2012 | Doelle et al. | |
| 8,402,835 | B2 | | 3/2013 | August et al. | |
| 2001/0001500 | A1 | | 5/2001 | Bryzek et al. | |
| 2004/0132227 | A1 | | 7/2004 | Horning et al. | |
| 2006/0043579 | A1 | * | 3/2006 | He et al. | ............ 257/712 |
| 2008/0271389 | A1 | * | 11/2008 | Reaveley et al. | ............ 52/167.8 |
| 2011/0132096 | A1 | | 6/2011 | Ricks | |
| 2011/0200130 | A1 | | 8/2011 | Choi et al. | |

OTHER PUBLICATIONS

International Search Report and Written Opinion of the International Searching Authority mailed on Jul. 26, 2012 for PCT Patent Application No. PCT/US2012/025497, 9 pages.

* cited by examiner

*Primary Examiner* — Andre Allen
(74) *Attorney, Agent, or Firm* — Kilpatrick Townsend & Stockton LLP

(57) ABSTRACT

Pressure sensors having components with reduced variations due to stresses caused by various layers and components that are included in the manufacturing process. In one example, a first stress in a first direction causes a variation in a component. A second stress in a second direction is applied, thereby reducing the variation in the component. The first and second stresses may be caused by a polysilicon layer, while the component may be a resistor in a Wheatstone bridge.

38 Claims, 13 Drawing Sheets

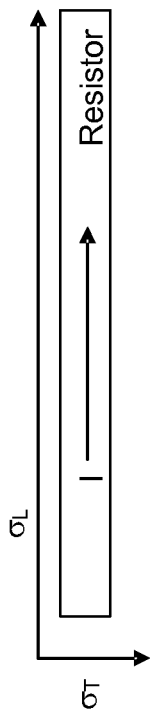

$$\frac{dR}{R0} = \pi_L \sigma_L + \pi_T \sigma_T$$

$$IF\ (\pi_L \sigma_L = -\pi_T \sigma_T)\ THEN\ \frac{dR}{R0} = 0$$

dR:   Change in resistance of the resistor due to stress
R0:   The resistance of the resistor without stress effects
I:    Current flow through the resistor which is along the longitudinal direction
$\pi_L$:   The piezoresistive coefficients along the resistor longitudinal direction
$\pi_T$:   The piezoresistive coefficients along the resistor transverse direction
$\sigma_L$:   The average stress along the resistor in the longitudinal direction
$\sigma_T$:   The average stress along the resistor in the transverse direction

Figure 15

COMPENSATION OF STRESS EFFECTS ON PRESSURE SENSOR COMPONENTS

CROSS-REFERENCES TO RELATED APPLICATIONS

This application is a continuation of U.S. patent application Ser. No. 13/029,114, filed Feb. 16, 2011, which is incorporated by reference.

BACKGROUND

Pressure sensors have become ubiquitous the past few years as they have found their way into several new types of products. Utilized in automotive, industrial, consumer, and medical products the demand for pressure sensors has skyrocketed and shows no signs of abating.

Pressure sensors typically include a diaphragm supported by a frame. When a pressure sensor experiences a pressure, the diaphragm responds by changing shape. This causes one or more characteristics of electronic components on the diaphragm to change. These changing characteristics can be measured, and from this the pressure can be determined.

Often, the electronic components are resistors that are configured as a Wheatstone bridge located on the diaphragm. As the diaphragm distorts due to a pressure, the resistance of the resistors change. This change results in an output of the Wheatstone bridge, from which the pressure can be measured.

Unfortunately, other factors can cause characteristics of these components to change. For example, various layers or other components may cause stress to be applied to components, such as resistors, thereby changing their values. Also, various layers used in manufacturing a pressure sensor may have coefficients of thermal expansion that are different from silicon. As a pressure sensor changes temperature, these layers may provide different stresses to the components. For example, one or more of these layers may provide stresses to resistors in a Wheatstone bridge. These stresses may change their resistances, and/or cause the diaphragm to change shape, thereby causing an output of the Wheatstone bridge even in the absence of an applied pressure. This output signal in the absence of an input pressure may be referred to as an offset. In addition, the offset can change as a function of temperature due to the change in stress over temperature which is referred to as the temperature coefficient of offset.

The offset and other mismatches can cause errors, skew pressure readings, and limit the usefulness of a pressure sensor. As a result expensive external compensation would be required to minimize the errors due to the offset and the temperature coefficient of offset.

Thus, what are needed are circuits, methods, and apparatus that provide pressure sensors having components with reduced variations due to stresses caused by various layers and components that are included in the manufacturing process.

SUMMARY

Accordingly, embodiments of the present invention provide pressure sensors having components with reduced variations due to stresses caused by various layers and components that are included in the manufacturing process.

In one exemplary embodiment of the present invention, a first stress in a first direction causes a variation in a component's characteristic. A second stress in a second direction is applied, thereby reducing the variation in the component's characteristic. The second direction can be in an arbitrary direction determined to minimize the components characteristic.

In an exemplary embodiment of the present invention, the component is a diffused resistor. A mathematical description of this effect for a resistor diffused in crystal silicon is shown in FIG. 15. In other embodiments of the present invention, the component may be an implanted, polysilicon, or other type of resistor, a capacitor, transistor, diode, or other active or passive component.

In another exemplary embodiment of the present invention, the first stress is caused by a geometry formed in a polysilicon layer over the component. In other embodiments of the present invention, the first stress may be caused by geometries in other layers, by other active or passive components formed as part of the pressure sensor, or by other effects, such as those resulting from device packaging.

In another exemplary embodiment of the present invention, the size and/or shape of the geometry formed in a polysilicon layer over the component is adjusted such that the variation in the component's characteristic caused by the first stress is reduced by the application of a second stress. In other embodiments of the present invention, the second stress may be caused by other layers, by other active or passive components formed as part of the pressure sensor, or by other effects, such as those resulting from device packaging.

In various embodiments of the present invention, a geometry formed in a polysilicon or other layer and sized to reduce component variations may have various shapes. In various embodiments of the present invention these geometries may be rectangular, square, circular, or they may have other shapes. In various embodiments of the present invention, they may have one or more openings or gaps. In addition these geometries can be remotely located from the stress sensitive component although typically they are in close proximity.

Various embodiments of the present invention may incorporate one or more of these and the other features described herein. A better understanding of the nature and advantages of the present invention may be gained by reference to the following detailed description and the accompanying drawings.

BRIEF DESCRIPTION OF THE DRAWINGS

FIG. 15 illustrates a mathematical description for minimizing the change in resistance of a diffused resistor in crystalline silicon due to stress by balancing the stress at the resistor location.

DESCRIPTION OF EXEMPLARY EMBODIMENTS

Figure 1:
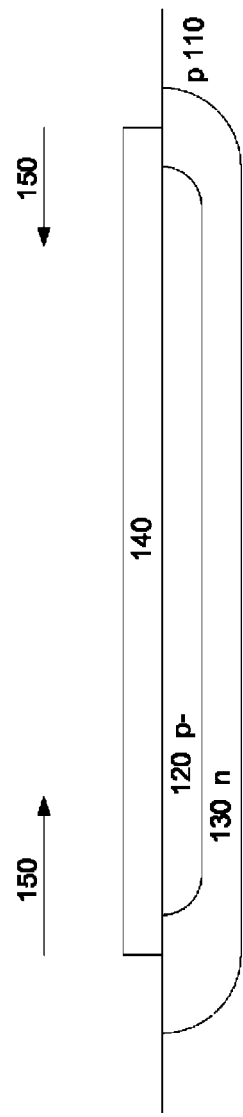
FIG. 1 is a side view of a resistor experiencing a first stress in a first direction due to a geometry formed in a polysilicon layer.

FIG. 1 is a side view of a resistor experiencing a first stress in a first direction due to a geometry formed in a polysilicon layer. This figure, as with the other included figures, is shown for illustrative purposes only, and does not limit either the possible embodiments of the present invention or the claims.

In this figure, a lightly doped p-type resistor 120 may be located in an n-type well 130. Well 130 may reside in substrate 110, which may be a diaphragm of a pressure sensor. Substrate 110 may be formed of a p– type material. Resister 120 may be covered by polysilicon layer 140.

Polysilicon layer 140 may be used as a shield to protect resistor 120 from external affects, such as charge trapping or charge migration. As such, polysilicon layer 140 may be electrically connected to well 130 and to a low impedance such as an appropriate bias or voltage supply.

It is typically desirable to not cover an entire diaphragm of a pressure sensor with polysilicon layer 140, since this will reduce the sensitivity of the pressure sensor. Also, it is desirable to have separate portions of the polysilicon layer 140 over each resistor on a diaphragm so that the separate portions are not electrically connected. In this way, the polysilicon associated with each resistor may be individually tied to that resistor's well, thereby reducing voltage effects and improving device matching. Accordingly, typically only specific areas that are to be protected, such as the area over resistor 120, are covered with polysilicon layer 140.

Unfortunately, due to stress and stress gradients within the layer, the geometry formed in polysilicon layer 140 may essentially try to curl, bow, or deform in shape. This bowing may result in a stress 150 in a first direction. This stress may cause the resistance of resistor 120 to vary. This variation may result in an offset signal in the pressure sensor. Polysilicon layer 140 may also have a different coefficient of expansion than the silicon including resistor 120. This variation in thermal coefficients may change the resistance of resistor 120 over temperature. Other effects, such as non-repeatability or hysteresis of the offset over temperature known as thermal hysteresis of offset, may also result. Accordingly, embodiments of the present invention apply a second stress, where the second stress reduces component variation, such as the variation in the resistance of resistor 120.

In these examples, the component experiencing a variation is a lightly doped p-type resistor 120. In other embodiments of the present invention, the component may be other types of resistors such as implant resistor, capacitor, diodes, transistors, or other active or passive components. Also, in this example, the first stress results from the geometry in polysilicon layer 140. In other embodiments of the present invention, other layers, such as silicon dioxide, silicon nitride, metal, or other layers may cause stresses on resistor 120. In yet other embodiments of the present invention, other active or passive components or the device packaging may cause stresses on resistor 120. Again, resistor 120 may be a resistor in a Wheatstone bridge located in a diaphragm of a pressure sensor. While this and the other included examples the resistor and other layers are part of a silicon based process, other embodiments of the present invention may utilize other processes, such as silicon germanium, or other types of processes.

Figure 2:
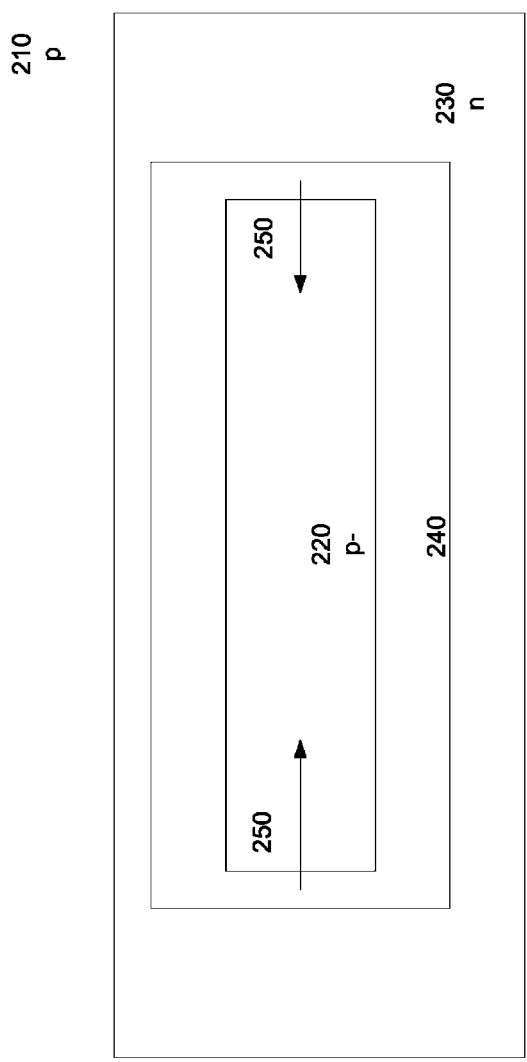
FIG. 2 illustrates a top view of a resistor experiencing a first stress in a first direction due to a geometry formed in a polysilicon layer.

FIG. 2 illustrates a top view of a resistor experiencing a first stress in a first direction due to a geometry formed in a polysilicon layer. In this example, resistor 220 resides in well 230. Polysilicon layer 240 covers resistor 220, and applies a stress 250 in a first direction to resistor 220.

Again, the stress 250 applied in a first direction to resistor 220 may cause variations in the resistance of resistor 220. These variations may cause offsets, thermal mismatches, and other inaccuracies. Accordingly, an embodiment of the present invention applies a second stress in a second direction to reduce this variation. An example is shown in the following figure.

Figure 3:
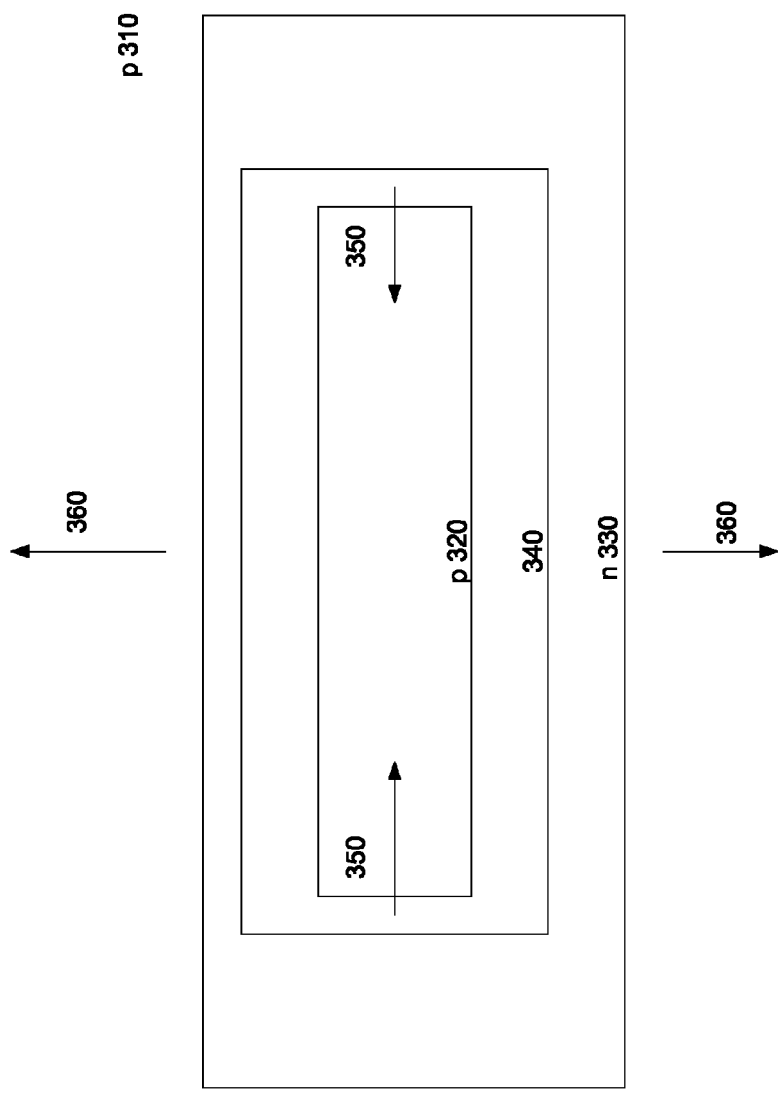
FIG. 3 illustrates a resistor experiencing a first stress in a first direction and a second stress in a second direction.

FIG. 3 illustrates a resistor experiencing a first stress in a first direction and a second stress in a second direction. In this example, the first stress is due to polysilicon layer 340, though in other embodiments of the present invention, this first stress may have other origins. A second stress 360 in a second direction is applied to reduce variations in the resistance of resistor 320. In this specific example, a second stress is shown as being at least approximately orthogonal to the first stress, though in other embodiments of the present invention, the two stresses may have a different relationship which is determined to minimize the components characteristic. Also, in other embodiments of the present invention, a third stress may also be applied to resistor 320. In still other embodiments of the present invention, four or more stresses may be applied to resistor 320.

In various embodiments of the present invention, the first stress and the second stress are applied in an attempt to minimize component variations. In other embodiments of the present invention, two or more stresses may be adjusted relative to each other such that a net variation is retained. This variation may then further be canceled or reduced by other stress effects. For example, if it is known that an effect, such as device packaging, may cause a stress, two or more other stresses caused by a polysilicon layer may be adjusted in a way to compensate for the packaging induced stress.

A flowchart illustrating a method of reducing variations by applying a second stress is shown in the following figure.

Figure 4:
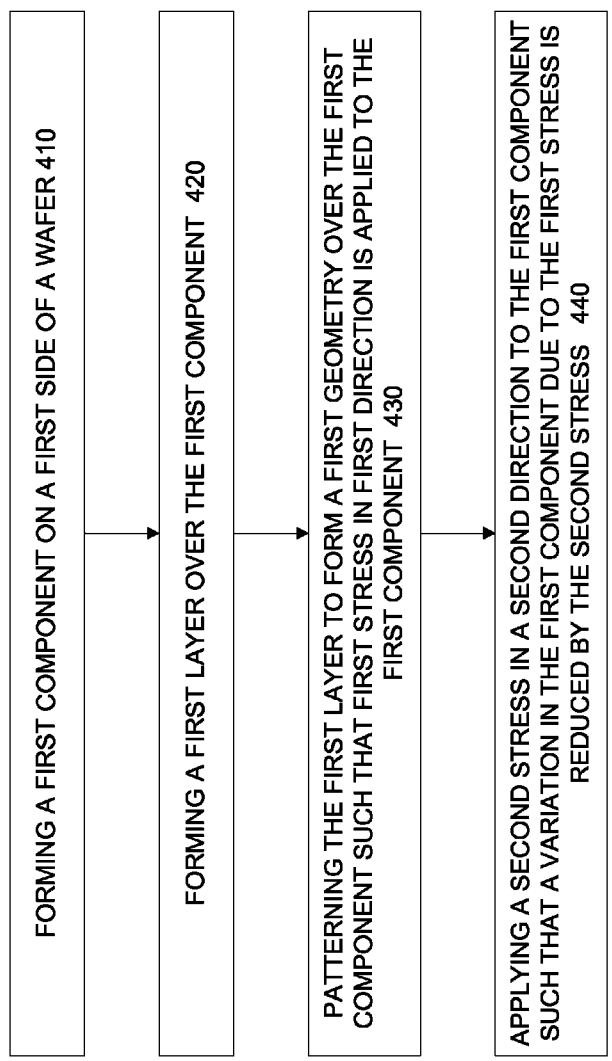
FIG. 4 is a flowchart of a method of reducing a variation in a component's characteristic according to an embodiment of the present invention.

FIG. 4 is a flowchart of a method of reducing a variation in a component's characteristic according to an embodiment of the present invention. In act 410, a first component is formed on a first side of a silicon wafer. This first component may be a resistor or other type of active or passive component. The wafer may be a diaphragm or other portion of a pressure sensor or other electrical component. In act 420, a first layer is formed over the first component. As before, this may be a polysilicon layer or other type of layer. In act 430, the first layer is patterned to form a first geometry over the first component such that a first stress in a first direction is applied to the component. In act 440, a second stress is applied in a second direction to the component such that a variation of the first component is reduced by the second stress.

In various embodiments of the present invention, the second stress may have one or more different origins. For example, the second stress may originate in the polysilicon layer 140. In other embodiments of the present invention, the second stress may originate in other layers, or in other active or passive components. In other embodiments of the present invention, the second stress may originate from other sources, such as packaging or other sources. In a specific embodiment of the present invention, a polysilicon geometry over a component is modified to reduce variations in one or more component characteristics caused by a first stress. An example is shown in the following figure.

Figure 5:
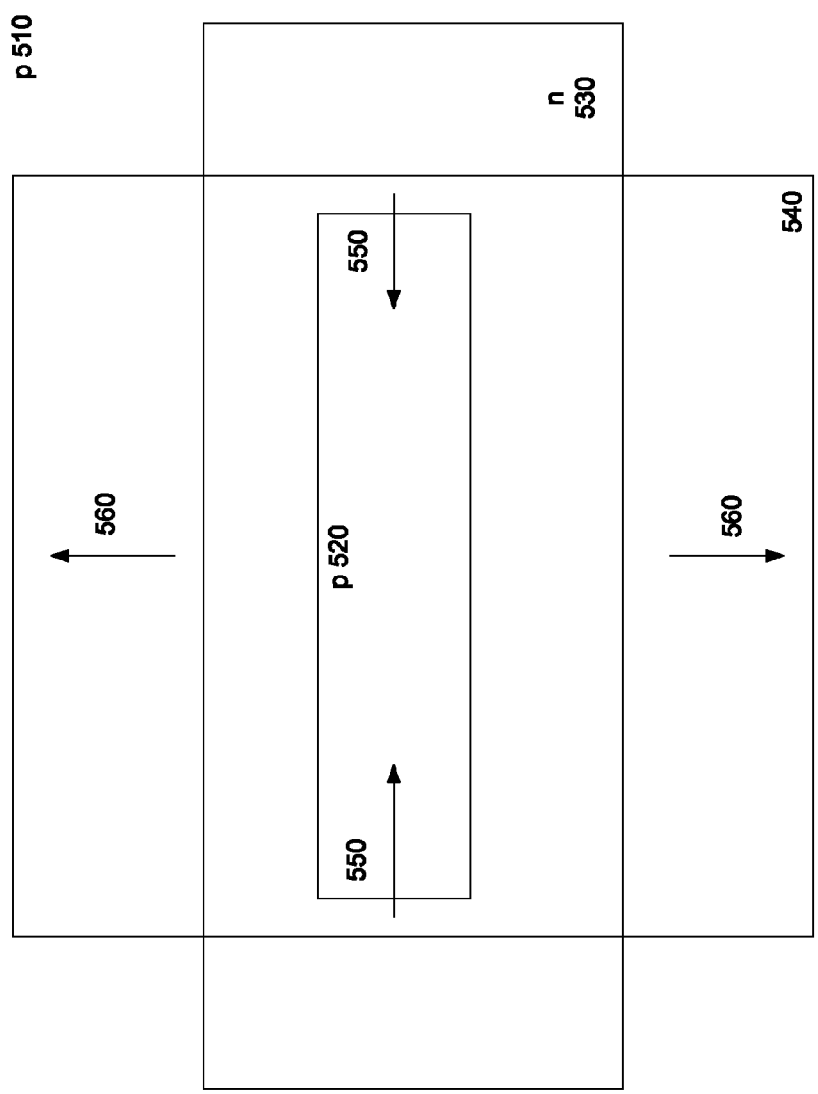
FIG. 5 illustrates a resistor experiencing a first stress a first direction and a second stress in a second direction.

FIG. 5 illustrates a resistor experiencing a first stress a first direction and a second stress in a second direction. In this example, polysilicon layer 540 has been sized to produce a second stress 560 in a second direction. As before, polysilicon layer 540 applies a first stress 550 in a first direction to resistor 520. The inclusion of the second stress 560 reduces the variation in the resistance of resistor 520.

Figure 6:
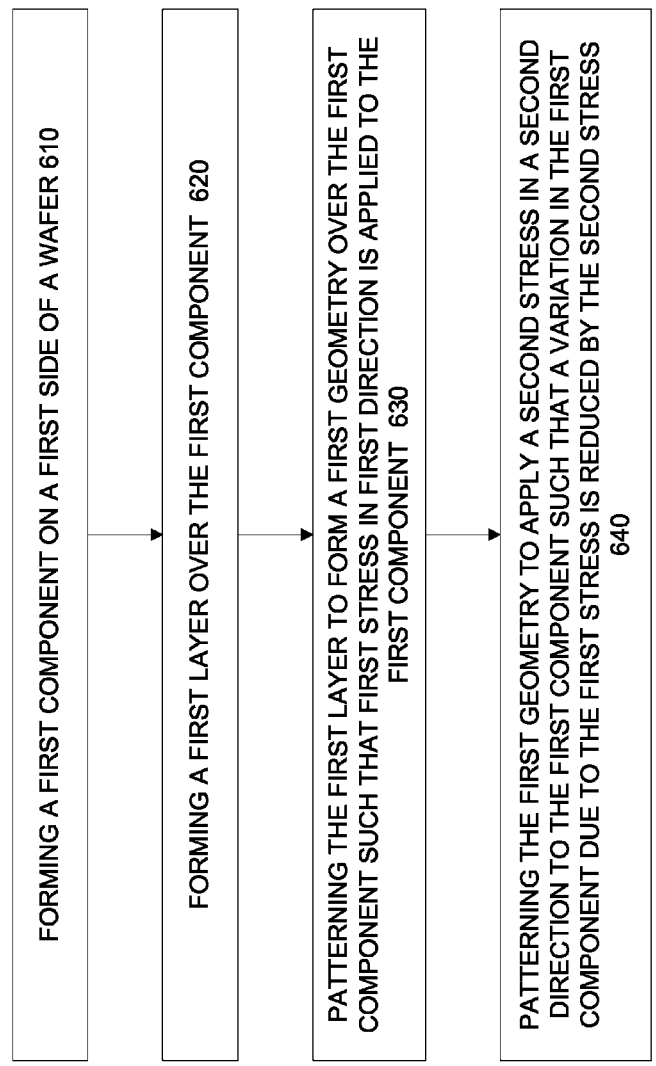
FIG. 6 is a flowchart of a method of reducing a variation in a component's characteristic according to an embodiment of the present invention.

FIG. 6 is a flowchart of a method of reducing a variation in a component's characteristic according to an embodiment of the present invention. In act 610, a component is formed in a first side of a wafer. In act 620, a first layer is formed over the first component. In act 630, the first layer is patterned to form a first geometry over the first component such that a first stress in a first direction is applied to the component. In act 640, the first geometry is patterned to apply a second stress in a second direction to the first component such that a variation in a component characteristic is reduced.

In the above examples, polysilicon layer 540 has been shown as being a solid geometry. In other embodiments of the present invention, these geometries may include one or more openings. These openings may be useful to direct stress to particular parts of a component. They may also be useful for other manufacturing steps, such as implantations, diffusions, bonding, or for other reasons. An example is shown in the following figure.

Figure 7:
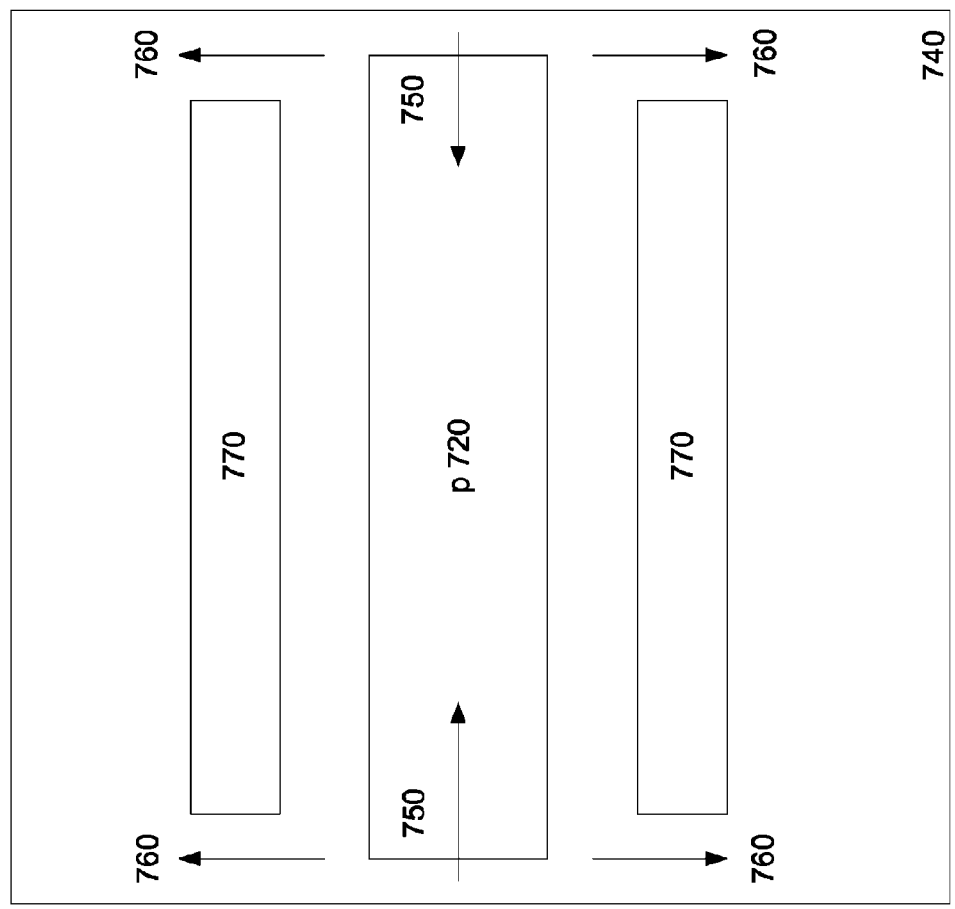
FIG. 7 illustrates a geometry formed in polysilicon layer according to an embodiment of the present invention.

FIG. 7 illustrates a geometry formed in polysilicon layer according to an embodiment of the present invention. This geometry resides over resistor 720 and has openings 770. This geometry provides a first stress 750 in a first direction and a second stress in a second direction 760 to resistor 720. The net result of the two stresses is a reduced variation in the resistance of resistor 720.

Figure 8:
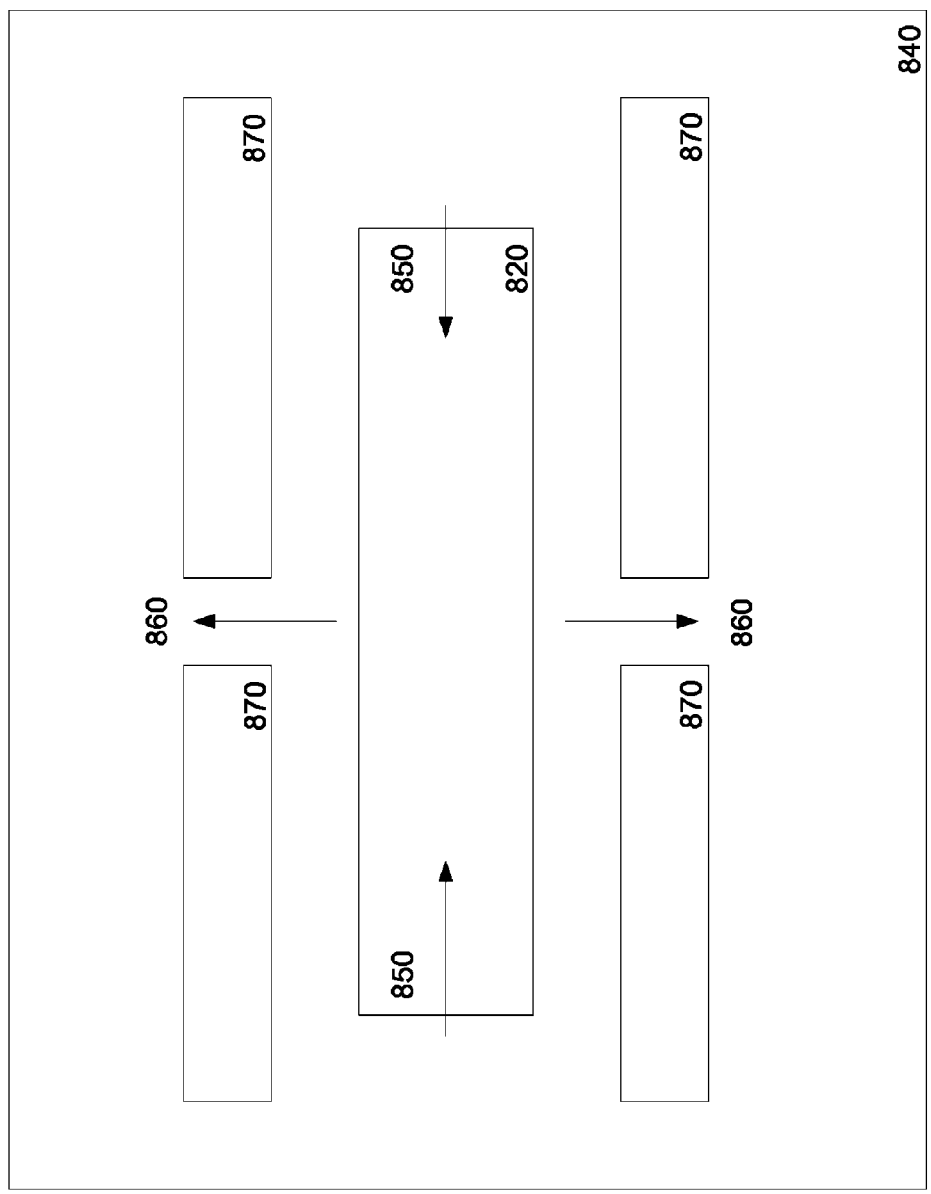
FIG. 8 illustrates another geometry formed in a polysilicon layer according to an embodiment of the present invention.

FIG. 8 illustrates another geometry formed in a polysilicon layer 840 according to an embodiment of the present invention. In this example, the geometry includes openings 870. As before, this geometry provides a first stress 850 in a first direction and a second stress 860 in a second direction to a resistor 820. As before, the second stress 860 reduces or eliminates variations in component 820.

Again, these resistors may be resistors in a Wheatstone bridge located on a pressure sensor diaphragm. These resistors may be individual resistors, or they may be part of a series or parallel combination of resistors. For example, they may be a resistor in a series of two resistors, where pairs of resistors form resistances in a Wheatstone bridge. An example is shown in the following figure.

Figure 9:
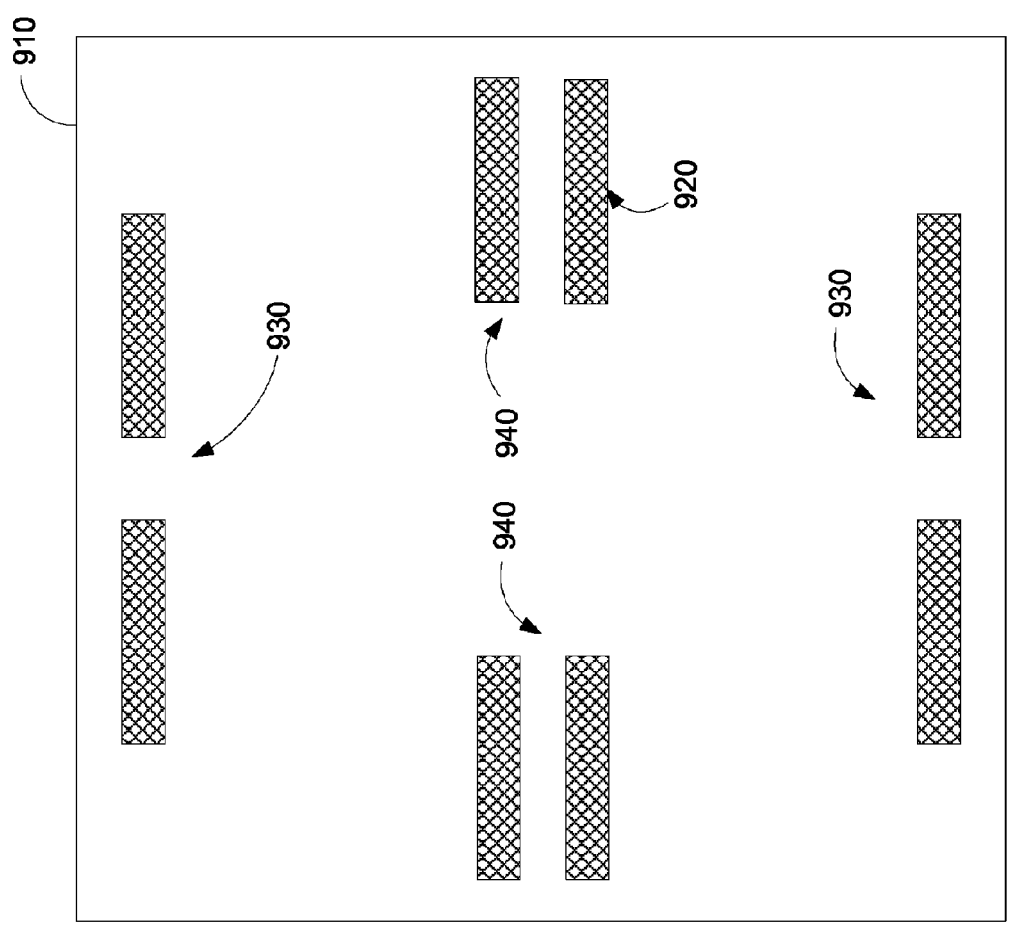
FIG. 9 illustrates resistors in a Wheatstone bridge located on a diaphragm of a pressure sensor according to an embodiment of the present invention with two of the resistor pairs in a linear configuration and the other two resistor pairs in a folded configuration.

FIG. 9 illustrates resistors in a Wheatstone bridge located on a diaphragm of a pressure sensor according to an embodiment of the present invention. In this example, pairs of resistors 930 are shown on the upper and lower part of the sensing diaphragm, and pairs of resistors 940 are shown on the left and right side of the diaphragm. The resistor pairs on the upper and lower part of the diaphragm 930 are formed of two linear resistors in series, while the resistor pairs on the left and right portion of the diaphragm 940 are formed of two folded resistors. In this example, the resistors in the upper and lower diaphragm location are associated with a first polysilicon geometry, while the resistors in the left and right diaphragm location are associated with a second polysilicon geometry. Examples are shown in the following two figures.

Figure 10:
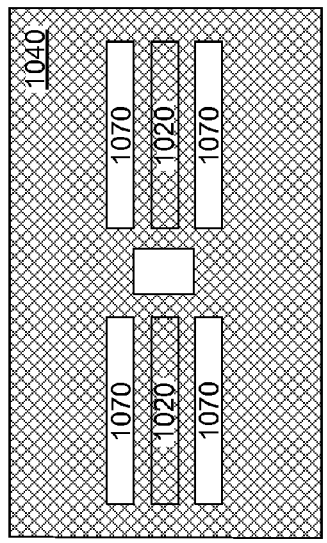
FIG. 10 illustrates a polysilicon geometry that may be placed over a pair of resistors in a linear resistor configuration according to an embodiment of the present invention.

FIG. 10 illustrates a polysilicon geometry that may be placed over a pair of resistors according to an embodiment of the present invention. Polysilicon geometry 1040 includes openings 1070. Polysilicon geometry 1040 covers resistors 1020.

Figure 11:
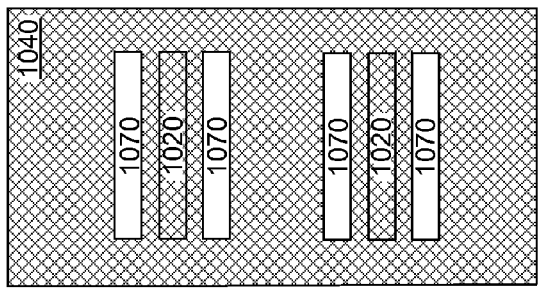
FIG. 11 illustrates a polysilicon geometry that may be placed over another pair of resistors in a folded resistor configuration according to an embodiment of the present invention.

FIG. 11 illustrates a polysilicon geometry that may be placed over another pair of resistors according to an embodiment of the present invention. Polysilicon geometry 1140 includes openings 1170. Polysilicon geometry 1140 covers resistors 1120.

Figure 12:
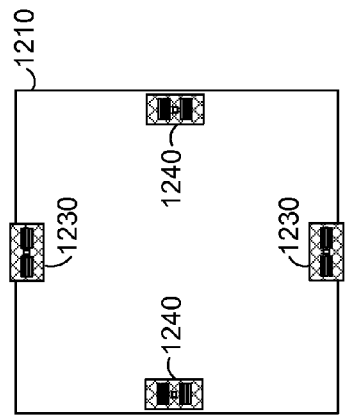
FIG. 12 illustrates a portion of diaphragm including polysilicon geometries and containing resistors in both the linear resistor configuration and the folded resistor configuration.

FIG. 12 illustrates a portion of diaphragm 1210 including polysilicon geometries 1230 and 1240. These polysilicon geometries 1230 and 1240 may be used to cover resistors 920 in the example of FIG. 9.

In various embodiments of the present invention, it is undesirable to route metal lines over a diaphragm, such as diaphragm 1210, as it may result in thermal hysteresis. Accordingly, very low-resistance regions formed of p+ material may be used to connect resistors, such as resistors 920. Examples are shown in the following figures.

Figure 13:
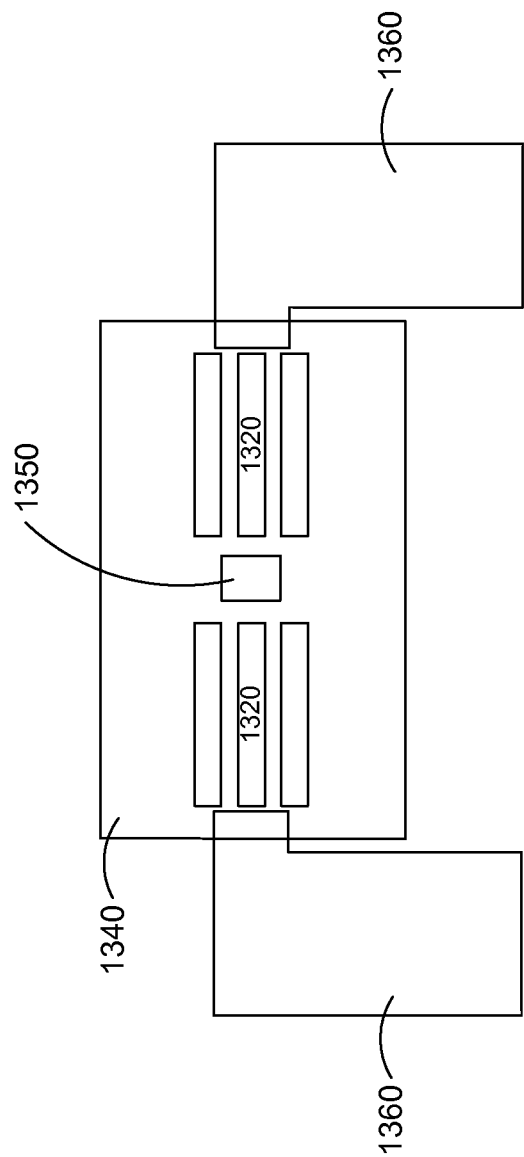
FIG. 13 illustrates low-resistance regions used to connect the resistors in a linear configuration according to an embodiment of the present invention.

FIG. 13 illustrates low-resistance regions used to connect resistor pairs in a linear configuration according to an embodiment of the present invention. In this example, low-resistance regions 1350 and 1360 are used to connect resistors 1320 to each other and to other interconnect lines (not shown).

Figure 14:
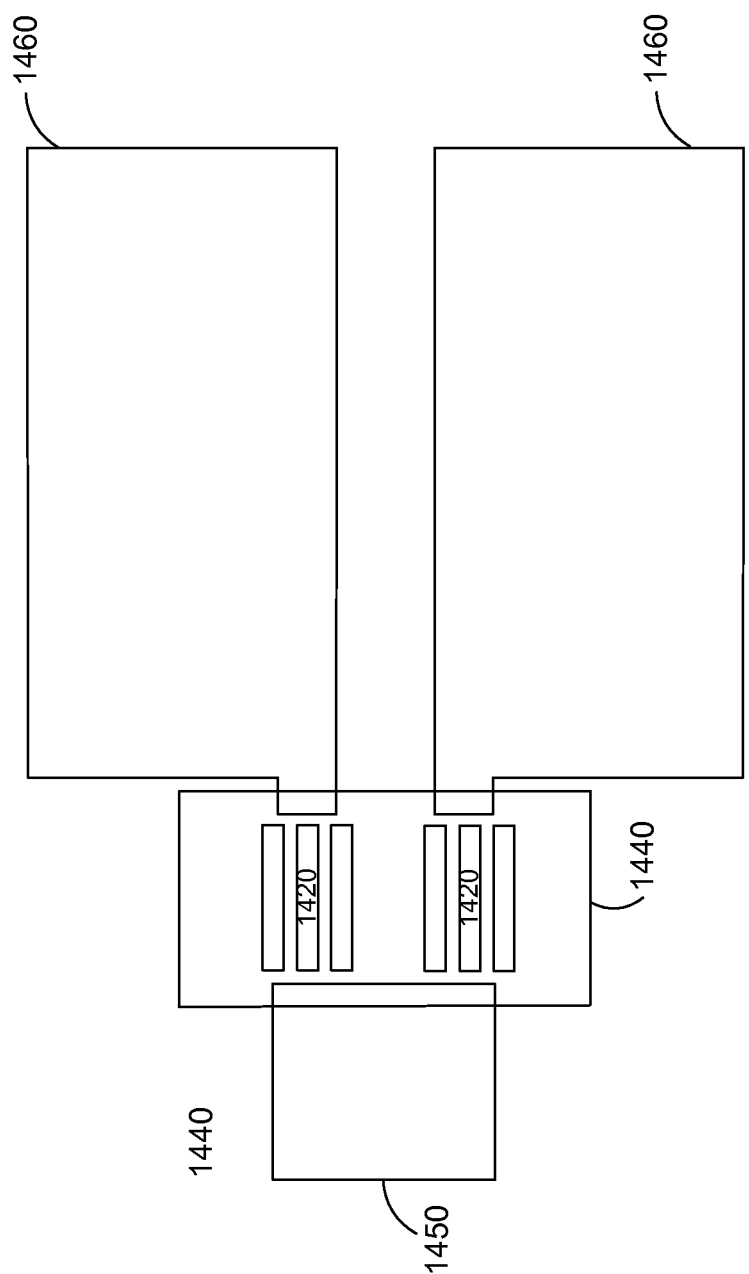
FIG. 14 illustrates low-resistance regions used to connect the resistors in a folded configuration according to an embodiment of the present invention.

FIG. 14 illustrates low-resistance regions used to connect resistor pairs in a folded configuration according to an embodiment of the present invention. In this example, low-resistance regions 1450 and 1460 are used to connect resistors 1420 to each other and to other interconnect lines (not shown).

FIG. 15 illustrates a mathematical description for minimizing the change in resistance of a diffused resistor in crystalline silicon due to stress by balancing the stress at the resistor location.

The above description of embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated. Thus, it will be appreciated that the invention is intended to cover all modifications and equivalents within the scope of the following claims.

What is claimed is:

1. A pressure sensor comprising:
   a first component on a first side of a die, the first component having a first characteristic;
   a first layer over the first component; and
   a first geometry patterned in the first layer,
   wherein a first stress is applied to the first component in a first direction, and the first geometry is patterned such that a second stress is applied in a second direction to the first component such that a variation in the first characteristic of the first component due to the first stress is at least reduced by the second stress.

2. The pressure sensor of claim 1 wherein the second stress is determined by the shape of the first geometry in the second direction.

3. The pressure sensor of claim 1 wherein the variation in the first characteristic of the first component due to the first stress is approximately cancelled by the second stress.

4. The pressure sensor of claim 1 wherein the first stress in the first direction is applied to the first component by a first source.

5. The pressure sensor of claim 4 wherein the first source is one of a second geometry in a second layer, a second component, or packaging for the pressure sensor.

6. The pressure sensor of claim 1 wherein the first stress in the first direction is applied to the first component by the first geometry in the first layer.

7. The pressure sensor of claim 1 wherein the first component comprises a diffused resistor.

8. The pressure sensor of claim 1 wherein the first component is a lightly-doped resistor.

9. The pressure sensor of claim 1 wherein the variation in the first characteristic of the first component is a variation in resistance of a resistor.

10. The pressure sensor of claim 1 wherein the first direction and the second direction have an arbitrary angular relationship that is determined to minimize the variation in the first component's first characteristic.

11. The pressure sensor of claim 1 wherein the first component is a MOSFET transistor.

12. The pressure sensor of claim 1 wherein the first component is a MOSFET transistor and the variation in the first characteristic of the first component is a variation in mobility of the MOSFET transistor.

13. The pressure sensor of claim 1 wherein the first layer is a polysilicon layer.

14. The pressure sensor of claim 1 wherein the first layer is a metal layer.

15. The pressure sensor of claim 1 wherein the first layer is an oxide or nitride layer.

16. The pressure sensor of claim 1 wherein the first direction and the second direction are at least approximately orthogonal.

17. The pressure sensor of claim 1 wherein the first geometry comprises an opening.

18. The pressure sensor of claim 1 wherein the first geometry comprises a plurality of openings.

19. A pressure sensor comprising:
a diaphragm surrounded by a frame;
a resistor located on or at least near the diaphragm;
a first layer over the resistor,
a first geometry formed in the first layer,
wherein a first stress is applied to the resistor in a first direction, and the first geometry is formed over the resistor such that the first geometry provides a second stress in a second direction to the resistor, and
wherein the second stress reduces a change in resistance of the resistor caused by the first stress.

20. The pressure sensor of claim 19 wherein the first stress in the first direction is applied to the resistor by a first source.

21. The pressure sensor of claim 20 wherein the first source is one of a second geometry in a second layer, a first component, or packaging for the pressure sensor.

22. The pressure sensor of claim 19 wherein the first stress in the first direction is applied to the resistor by the first geometry in the first layer.

23. The pressure sensor of claim 19 wherein the first geometry is approximately rectangular in shape.

24. The pressure sensor of claim 19 wherein the first geometry includes a plurality of openings.

25. The pressure sensor of claim 19 wherein the resistor is a lightly-doped p-type resistor located in an n-type region.

26. The pressure sensor of claim 25 wherein the first layer is a polysilicon layer.

27. The pressure sensor of claim 26 wherein the resistor is a resistor in a Wheatstone bridge.

28. The pressure sensor of claim 19 wherein the first geometry comprises an opening.

29. A method of manufacturing a pressure sensor, the method comprising:
forming a first resistor on a first side of a wafer, the first resistor having a first resistance;
forming a first layer over the first resistor; and
forming a first geometry in the first layer,
wherein a first stress is applied to the first resistor in a first direction, and the first geometry causes a second stress to be applied in a second direction to the first resistor, such that a variation in the first resistance of the first resistor due to the first stress is at least reduced by the second stress.

30. The method of claim 29 wherein the first stress in the first direction is applied to the first resistor by a first source.

31. The method of claim 30 wherein the first source is one of a second geometry in a second layer, a first component, or packaging for the pressure sensor.

32. The method of claim 29 wherein the first stress in the first direction is applied to the first resistor by the first geometry in the first layer.

33. The method of claim 29 wherein the first resistor is a lightly-doped p-type resistor located in an n-type region.

34. The method of claim 29 wherein the first layer is a polysilicon layer.

35. The method of claim 29 wherein the first geometry includes a plurality of openings.

36. The method of claim 29 wherein the first direction and the second direction are at least approximately orthogonal.

37. The method of claim 29 wherein the first direction and the second direction have an arbitrary angular relationship that is determined to minimize variation in the first resistor's first resistance.

38. The method of claim 29 wherein forming the first geometry comprises forming an opening.

* * * * *